United States Patent
Ruff et al.

(10) Patent No.: US 12,434,191 B2
(45) Date of Patent: *Oct. 7, 2025

(54) EXAMINATION OF A REVERSE-OSMOSIS DEVICE FOR THE USAGE WITH DIALYSIS DEVICES

(71) Applicant: Fresenius Medical Care Deutschland GmbH, Bad Homburg (DE)

(72) Inventors: Christian Ruff, Oberursel (DE); Thomas Pohl, Friedrichsdorf (DE); Michael Wild, Bad Homburg (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 733 days.

This patent is subject to a terminal disclaimer.

(21) Appl. No.: 16/763,311

(22) PCT Filed: Nov. 12, 2018

(86) PCT No.: PCT/EP2018/080875
§ 371 (c)(1),
(2) Date: May 12, 2020

(87) PCT Pub. No.: WO2019/092232
PCT Pub. Date: May 16, 2019

(65) Prior Publication Data
US 2020/0294648 A1    Sep. 17, 2020

(30) Foreign Application Priority Data
Nov. 13, 2017   (DE) .......................... 102017126592.9

(51) Int. Cl.
*B01D 61/02*    (2006.01)
*A61M 1/16*    (2006.01)
(Continued)

(52) U.S. Cl.
CPC ......... *B01D 61/025* (2013.01); *A61M 1/1601* (2014.02); *A61M 1/1656* (2013.01);
(Continued)

(58) Field of Classification Search
CPC .. A61M 1/1601; A61M 1/1656; A61M 1/168; A61M 1/1694; B01D 61/025;
(Continued)

(56) References Cited

U.S. PATENT DOCUMENTS 6,106,723 A    8/2000    Grandics et al.
6,120,689 A    9/2000    Tonelli et al.
(Continued)

FOREIGN PATENT DOCUMENTS

CN    102131533 A    7/2011
CN    102958585 A    3/2013
(Continued)

OTHER PUBLICATIONS

Monitoring your Dialysis Water Treatment System. Northwest Renal Network (online at www.serim.com/docs/WaterManual.pdf) ( Year: 2005).*
(Continued)

*Primary Examiner* — Terry K Cecil
(74) *Attorney, Agent, or Firm* — Fish & Richardson P.C.

(57) ABSTRACT

An electronic safety system includes a RO-device configured to produce ultrapure water. The RO-device has a sensor unit for collecting sensor data. The RO-device comprises an electronic data interface in order to send the sensor data collected by the sensor unit. The system also includes an analysis unit which is configured to analyse a water sample with regards to safety requirements and with regard to contamination and to generate result data. The analysis unit includes an analysis interface in order to send the generated result data in electronic form. The system also includes a
(Continued)

network for the data exchange between the medical-technical entities, for example, between the RO-device and the analysis unit.

13 Claims, 4 Drawing Sheets

(51) Int. Cl.
    *B01D 61/12*         (2006.01)
    *B01D 61/24*         (2006.01)
    *B01D 61/58*         (2006.01)
    *G16H 20/40*        (2018.01)
    *G16H 40/20*        (2018.01)
    *G16H 40/60*        (2018.01)
    *G16H 40/63*        (2018.01)

(52) U.S. Cl.
    CPC .......... *A61M 1/1694* (2013.01); *B01D 61/12* (2013.01); *B01D 61/243* (2013.01); *B01D 61/58* (2013.01); *G16H 20/40* (2018.01); *G16H 40/20* (2018.01); *G16H 40/60* (2018.01); *G16H 40/63* (2018.01); *A61M 1/168* (2013.01)

(58) Field of Classification Search
    CPC ...... B01D 61/12; B01D 61/243; B01D 61/58; G16H 20/40; G16H 40/20; G16H 40/60; G16H 40/63
    See application file for complete search history.

(56) References Cited

U.S. PATENT DOCUMENTS

| | | |
|---|---|---|
| 7,320,756 B2 | 1/2008 | Mukhopadhyay |
| 8,114,259 B2 | 2/2012 | Zuback et al. |
| 10,646,634 B2 | 5/2020 | Yu et al. |
| 10,913,031 B2 * | 2/2021 | Ruff ................. B01D 61/58 |
| 10,973,968 B2 * | 4/2021 | Rohde ............... G16H 40/63 |
| 2002/0077777 A1 | 6/2002 | Wolfe et al. |
| 2002/0130069 A1 | 9/2002 | Moskoff |
| 2004/0138840 A1 | 7/2004 | Wolfe |
| 2010/0332149 A1 | 12/2010 | Scholpp |
| 2011/0284480 A1 | 11/2011 | Karabelas et al. |
| 2014/0044485 A1 | 2/2014 | Wallace |
| 2014/0110304 A1 | 4/2014 | Wu et al. |
| 2014/0276375 A1 | 9/2014 | Minkus |
| 2014/0291253 A1 | 10/2014 | Coulter |
| 2014/0373926 A1 | 12/2014 | Jha et al. |
| 2018/0273412 A1 | 9/2018 | Hall et al. |

FOREIGN PATENT DOCUMENTS

| | | |
|---|---|---|
| CN | 103372237 A | 10/2013 |
| CN | 106110889 | 11/2016 |
| DE | 102010031530 | 1/2012 |
| DE | 102012109861 | 4/2014 |
| DE | 112013005089 | 7/2015 |
| FR | 2911687 | 7/2008 |
| JP | H09-220566 A | 8/1997 |
| WO | WO 00/36412 | 6/2000 |
| WO | WO 2010/024963 | 3/2010 |
| WO | WO 2012/041970 | 4/2012 |
| WO | WO 2018/094438 | 5/2018 |

OTHER PUBLICATIONS

National Standards Authority of Ireland, "Water for haemodialysis and related therapies," NSAI Standard I.S. EN ISO 13959, Dec. 2, 2015, 44 pages.

International Preliminary Report on Patentability in Application No. PCT/EP2018/080875, dated May 19, 2020, 9 pages.

International Search Report and Written Opinion in Application No. PCT/EP2018/080875, dated Mar. 1, 2019, 6 pages.

* cited by examiner

EXAMINATION OF A REVERSE-OSMOSIS DEVICE FOR THE USAGE WITH DIALYSIS DEVICES

CROSS REFERENCE TO RELATED APPLICATIONS

The present application is the national stage entry of International Patent Application no. PCT/EP2018/080875, filed on Nov. 12, 2018, and claims priority to Application No. DE 10 2017 126592.9, filed in the Federal Republic of Germany on Nov. 13, 2017, the disclosure of which are expressly incorporated herein in entirety by reference thereto.

TECHNICAL FIELD

The present disclosure relates to a system, an analysis device, a reverse-osmosis device, a server, and a method for the security check of the water that is fed in, and a computer program product.

BACKGROUND

Dialysis devices operate with ultrapure water. To be able to provide ultrapure water, reverse-osmosis devices (in the following RO-devices) are being used.

The basic physical principle of the reverse-osmosis serves for the concentration of substances dissolved in liquids. In the process, the natural osmosis process is reversed by means of pressure. Schematically, the RO-process can be described in such a way, that two containers are filled with liquid water of disparate substance content and especially salinity, which are separated from each other by a semipermeable membrane. After the application of a osmotic pressure in the container where the concentration is to be raised, the molecules of the solvent can migrate against their "natural" osmotic direction of propagation. For this process, the applied pressure must be higher than the pressure that arises from the osmotic desire to equalize concentration. The method pushes the molecules into the compartment in which the dissolved substances are existent less concentrated. With this method, the concentration of unwanted substances on the side of the ultrapure water is reduced.

The water produced by means of the RO-device is needed in the medical area and especially for the operating of dialysis machines, e.g., the haemodialysis system 5008 by Fresenius Medical Care and other extracorporeal blood treatment devices and is applied there.

It is inalienable for the adherence to strict safety requirements of the medical-technical devices that the water is provided with the required quality. For this purpose, the ultrapure water produced in the RO-device is checked for its adherence to the chemical and microbiological safety requirements in defined time intervals. This takes place in external laboratories. The conditions for the check are defined in the standard ISO 23500 "Guidance for the preparation and quality management of fluids for haemodialysis and related therapies".

Generally, a water sample of the ultrapure water is taken from the RO-device or the connected ring line and is sent to a laboratory. The laboratory requires usually several days for providing a lab report or result which is forwarded to the operator of the RO-device via post or telephone call according to the state of the art.

SUMMARY

Features, advantages or alternative embodiments mentioned thereby may also be transferred to the other embodiments and vice versa. In other words, the structural claims (that refer e.g., to the analysis unit, the RO-device or the server) and the system claims can also be developed with the features that are described and claimed in connection to the method. The corresponding functional features of the method are developed by corresponding physical modules, especially by electronic hardware modules or microprocessor modules of the system or the device and vice versa.

According to a first aspect, electronic safety system for a RO-device, whereby the safety system can be operated as a central, server- and particularly cloud-based system for securing sufficient ultrapure water quality and whereby the RO-device is built for the use and/or operation with a network of medical-technical devices, especially dialysis devices. The safety system comprises:

The RO-device that is designed to produce ultrapure water and that is developed with a sensor unit for determining sensor data, especially of a conductivity before and after the membrane with a retention and whereby the RO-device comprises an electronic data interface to exchange analogue and/or digital data in order to send the sensor data determined by the sensor unit to an external entity outside of the RO-device;

An analysis unit which can be provided e.g., in a laboratory with a laboratory apparatus for examining or analyzing the water quality of a water sample of the RO-device with respect to safety requirements for the ultrapure water (e.g., in regards to contaminations) and wherein the analysis unit is adapted to generate result data, wherein the analysis unit is still further provided with an analysis interface in order to send the generated result data in electronic format to an external entity outside of the analysis unit;

A network for the data exchange between medical-technical institutions of the safety system, particularly between the RO-device and the analysis unit.

According to a preferred embodiment, the system comprises a server which is designed to receive the sensor data of the RO-device and/or the result data of the analysis unit and that is furthermore designed to transfer the result data to the RO-device and/or the medical-technical devices that are connected to the RO-device for the purpose of operating. If necessary, the result data can be transferred to other devices which are integrated in the respective entity (hospital/hospital unit) in which the RO-device is installed. This embodiment has the advantage that the server can be developed in the cloud and thus can provide sufficient technical resources (e.g., CPU power, storage capacity, implementation of applications e.g., for the purpose of evaluation). Furthermore, this enables a central processing and an aggregation of data, whereby the generated data can be transferred quickly and in time to the peripheral clients (e.g., medical-technical devices, RO-device) via a network connection or the respective control interface.

Another important technical advantage is to be seen in the fact that the RO-device and/or e.g., the dialysis device can be open or closed loop controlled directly on the basis of the result data. If the result data index e.g., a deficiency regarding the water quality, this can be transferred directly to the receivers, thus e.g., the dialysis devices as early as possible in order to disconnect them from the RO-water system or, if possible, exchange it for another connection. Additionally, the evaluation system on the server can access a rule base that is dynamically adaptable during operation in which there are provided rules which define e.g., that in the case of an error a warning message has to be generated and sent to different computer-based or electronic reception accounts (e.g., mobile terminals of a ward physician or computer in the nurses' station) to permit quick actions.

The server with the evaluation application can additionally receive further data from other data sources, e.g., from a water supply unit which is designed to supply the RO-device with water or from other devices that are connected to the RO-device or are supplied by it or operated by it. The water supply unit can be developed with a measuring unit in order to determine the water consumption data and transfer them to the server. The server can provide a first result on the basis of the transferred water consumption data and/or sensor data according to a preferred embodiment. For this, there can be provided an evaluation unit on the server which evaluates the received data on the basis of a deposited rule data set. The rule data set can be changed dynamically during the operation of the system, too.

A rule can e.g., be: "If the sensor data fall below or exceed a predefinable threshold value, the water quality is not sufficient" or "If the sensor data lie within a predefinable interval and the water consumption data lie below a threshold value, the water quality is sufficient". The preliminary result determined like that can either be issued on the server via a user interface (e.g., in the first example above as a warning message) and/or can be transferred to the RO-device and further devices.

However, this preliminary result is based solely on the measured values and the sensor data. In order to validate the preliminary result, another analysis is arranged for. For this purpose, a water sample is analyzed in the analysis unit. Afterwards, result data can be provided. These data can be transferred to the server in order to validate or falsify the preliminary result. Depending on the outcome, the result data are issued again on a user interface of the server and/or are transferred to the RO-device or further devices. The latter occurs especially when the quality has been evaluated as non-sufficient in order to take countermeasures and disconnect particularly the dialysis devices from the water network. Thereby, the quality of the evaluation can be improved and a statement on the quality can be provided independently of an analysis on the laboratory scale. The RO-device can thus be advantageously monitored fundamentally more closely. Furthermore, it is reversely possible to specify the analysis result, which comes from the laboratory analysis, by means of the sensor data and/or the consumption data or, where applicable, it is possible to locate or indicate a reason. The application for the evaluation and validation—as described precedingly—does not have to be carried out on the server, but can also be swapped out, e.g., directly to the RO-device or to the analysis unit.

In another advantageous embodiment, the system comprises additionally a water supply unit which is designed for the supply of water to the RO-device and in which the water supply unit comprises a measuring unit for measuring water consumption data and in which the measuring unit comprises a bus interface to forward the determined water consumption data (in particular preferably to the server). With these data, more comprehensive evaluation processes can be started, and more comprehensive results can be provided. That way, an analysis result can time-wise be assigned to the water consumption data in order to be able to provide a more expansive statement. For consumption data, e.g., water consumption per hour/day/week/treatment, threshold values can be defined. If such a threshold value is exceeded, a message is issued. Up to that point it remains unclear, why it came to an exceedance. If other water quality data is available, e.g., the conductivity of the raw water or feed water and if this data show a threshold value exceedance as well, a reason can already be located/indicated based on this intelligent (data-driven) association.

In another advantageous embodiment, the result data are determined in electronic form in a pre-defined, standardized format. That way, all result data can be processed consistently on the server and/or received on the RO-device, even if the analysis units are operated by different operators with different methods and/or applications. This enhances the compatibility of the system and the connected systems.

The sensor data collected by the sensor unit comprise parameters, which represent the correct functioning of the RO system. The parameters comprise such as the conductivity of the water, wherein there are determined two different parameters in particular, namely before and after the membrane (feed water conductivity, permeate conductivity), as well as parameters on retention. The retention R can e.g., be determined with the help of the conductivity of the feed water cSP and the conductivity of the permeate cP as follows:

$$R[\%]=(cSp-cP)/cSp*100.$$

In alternative embodiments, other parameters can be determined in order to enhance the significance of the analysis or of the evaluation on the server (e.g., electric power and water consumption of the water treatment plant, temperature of the water, water hardness, chlorine concentration).

An RO-device produces ultrapure water and has a sensor unit for collecting sensor data and with an electronic data interface which is designed for the use in an aforementioned safety system.

Furthermore, an analysis unit arranged for example, in a laboratory with at least one laboratory apparatus, examines and analyzes the water quality of a water sample of the RO-device with regard to safety requirements for the ultrapure water (e.g., with regard to contamination). The analysis device is intended to generate electronic result data in response to the analysis of the water sample, wherein the analysis device is further configured with an analysis interface for sending the generated result data in electronic form to an external instance outside the analysis device and with the analysis unit being configured for the use in a safety system.

A server coordinates processing of security data of a RO-device which is operated for at least one medical-technical device, especially a dialysis device, with the server being designed for the use in a safety system as described above. The server is equipped with:

An electronic data interface for the exchange of digital and/or analogue data, in order to receive the sensor data collected by the sensor unit;

An analysis interface to receive the result data generated by the analysis unit in electronic form.

In an advantageous embodiment, the server is constructed with a memory for saving the received data and/or interacts with a data base and/or comprises a processing unit for the specific processing of the received data. Thereby, historic data can be processed as well.

A method for the safety-related check of a RO-device which is built for the operation of at least one medical-technical device, in particular a dialysis device, includes the following method steps:

Collecting sensor data during the operation of the RO-device which is built for the production of ultrapure water;

Sending the collected sensor data to an external communication partner in electronic form. The external communication partner is thus outside the RO-device and outside the RO-device system, so that a check independent of the RO-device can be ensured:

In a preferred embodiment, on a laboratory system after sending the sensor data or in parallel to the sending, an analysis of a water sample of the RO-device can be carried out with regard to safety requirements in order to generate result data based on the analysis. The generated result data can be sent in electronic form and in particular for controlling the RO-device and/or the dialysis machine to the above mentioned devices. Alternatively, the RO-device and/or the dialysis machine can also be controlled on the basis of the result data.

In a preferred embodiment, the sending of the collected sensor data occurs continuously or time-controlled during the operation of the RO-device and/or according to pre-definable events.

In another preferred embodiment, the sensor data and the result data are transmitted to a server for central processing and are saved there and are especially transmitted to a statistical evaluation across RO-devices.

In another preferred embodiment, the result data are sent directly to the at least one medical-technical device for the operation of said device in order to trigger locally an emergency interruption or an emergency stop if necessary.

A computer program product comprises a computer program. The computer program comprises software code which is designed for the execution of the abovementioned method. The computer program product can be implemented in software or hardware and can comprise additionally to the computer program a user's manual, a data medium and/or a packaging. In particular, the method steps of collecting, sending and generating result data and their sending via software are triggered and/or executed. Analysing the sample can however comprise several individual operations, which can occasionally require human operating, while the generating of result data on the other hand can occur fully automatic.

In the following, the terms used in this application are defined.

The RO-device is an RO-device for the production of ultrapure water and is used with at least one medical-technical device, in order to supply said device with ultrapure water. It can thus also be called medical-technical device. The RO-device may include an electronic processing unit (e.g., in the form of a CPU, FPGA, microprocessor, etc.). The sensor unit may be implemented on the electronic processing unit. The norm ISO 13959:2014 defines the demands on dialysis water (ultrapure water) which an operator of a respective device has to fulfil. Hereby, it resorts to the norm ISO 13959:2014 "Water for haemodialysis and related therapies", which can be used by the producer of those devices and which indicates the following requirements to the microbiological and chemical quality of dialysis water:

|  | | Threshold values | |
| --- | --- | --- | --- |
|  | Medium | Total bacterial count KbE/ml | Endotoxin concentration EU/ml |
| ISO 13959: 2014 Water for haemodialysis and related therapies | Dialysis water | <100 (AL* = 50) | <0.25 (AL* = 0.125) |

*AL = Action level. ISO 13959: 2014: concentration from which on steps should be carried out in order to interrupt the trend towards higher, inacceptable values. The value usually lies at 50% of the threshold vaule..

| | Parameters with proven toxicity during the dialysis | Threshold value [mg/l] | Electrolyte | Threshold value [mg/l] | Trace elements | Threshold value [mg/l] |
| --- | --- | --- | --- | --- | --- | --- |
| ISO 1359: 2014 | Aluminium | 0.01 | Calcium | 2 | Antimony | 0.006 |
| | Lead | 0.005 | Potassium | 8 | Arsenic | 0.005 |
| | Fluoride | 0.2 | Magnesium | 4 | Barium | 0.1 |
| | Total chlorine | 0.1 | Sodium | 70 | Beryllium | 0.0004 |
| | copper | 0.1 | | | Cadmium | 0.001 |
| | Nitrate as | 2 | | | Chromium | 0.014 |
| | Sulfate | 100 | | | Mercury | 0.0002 |
| | Zinc | 0.1 | | | Selenium | 0.09 |
| | | | | | Silver | 0.005 |
| | | | | | Thallium | 0.002 |

The correct operational capability of the RO-device is defined among others by means of the retention of sodium chloride (common salt), which-depending on the profile of requirements to the ultrapure water—should lie between 90% and 99.8%.

The RO-device and the laboratory system with the analysis unit are installed and provided on two different, separate systems. Usually, the RO-device is provided in a dialysis center (e.g., in an area separate from the dialysis area) where the dialysis machines are also operated. The laboratory system, however, is located in an external laboratory outside the dialysis center. The reason for this is that the analysis performed can also be carried out independently (and thus uninfluenced) by the operator of the RO-device. This helps to avoid conflicts of interest. The analysis unit and the RO-device communicate via a data connection. The data connection can be internet-based and can be based, for example, on a protocol of the http(s) protocol family. The RO-device and the laboratory system are operated on different platforms and by different operators.

The analysis unit can be a part of a laboratory system for the examination of water samples. The analysis unit is the electronic part and serves for the digital data processing and for communicating the data to external communication entities. Apart from the analysis unit, the laboratory system thus usually comprises at least one laboratory apparatus or device respectively (e.g., a conductivity meter, an ion chromatograph, a mass spectrograph or an atomic absorption spectrometer for the quantitative determination of single ions, etc.). The laboratory system serves for detecting contamination of the water as well as for carrying out a biological and/or chemical analysis as well as bacteriological examination. Thus, one aspect relates to a comprehensive analysis of the water sample of the RO-device. Thus, not only is the chlorine content tested, but further tests are carried out to detect contamination of the water (impurities, biological impurities or bacteriological contamination, etc.). Based upon the executed analysis by means of the devices and apparatuses mentioned above by way of example, and/or by means of laboratory apparatuses, a laboratory result is provided. The result is supplied to an analysis unit, which is configured to automatically generate result data based thereon, e.g., in the form of an electronic message. The result data may be prepared for sending to external communication partners. The result data are especially to be sent to the RO-device and/or to a cloud-based server and/or to the medical-technical devices via a data connection in order to initiate further measures there if necessary.

The network is an electronic network for transferring data. It can be operated with different protocols. Thus, the connection between the RO-device and the server can be designed as an MBUS-system (especially according to the standard of the series of standards EN13757) and the analysis unit communicates with the server and/or the medical-technical devices via an IP-based protocol, e.g., by means of messages in a XML-structure. For the data exchange, the RO-device and/or the analysis unit are designed with interfaces: the RP-device with a data interface (e.g., by means of an IP-based protocol) and the analysis unit with an analysis interface (e.g., HL7): by means of those interfaces, the data can be transferred in the form of a table-like data structure, e.g., in the formats of csv, Microsoft Excel or OpenOffice Calc or xml etc.

The generated result data can be transferred in the form of status messages (insufficient water quality—sufficient water quality) or in the form of more comprehensive message packages, whereby the message packages comprise further detailed information on the analysis. They can also comprise meta data, e.g., a time stamp, the condition of the sample, the duration of the examination etc.

As described above, the system may comprise a-preferably cloud-based-server. On the server, the collected and generated data are aggregated and preferably saved. For this purpose, access to a connected data base can be provided. The server can serve for the concerted processing of data. "Concerted" refers in this context to the fact that the result data have been determined for a network of dialysis devices, namely those dialysis devices that are supplied by the respective RO-device. The concerted determination can however also be carried out locally on a decided device, although still centrally for all devices of the network together.

On the server, an evaluation unit in the form of an evaluation application (software) or an evaluation circuit (hardware) can be developed. The evaluation unit is an electronic component. The evaluation circuit can e.g., be developed as an electronic circuit with digital and/or analogue circuit components which can comprise an evaluation logic. The evaluation logic serves to evaluate which quality levels an analysed RO-device adheres to in order to issue a warning message in case of non-adherence. The warning message can be issued via respective data interfaces to the RO-device, to a control unit of the RO-device and/or directly to the medical-technical devices (dialysis devices). For immediate signalling, a traffic light logic can be issued on a user interface (red for too little quality, green for sufficient quality and yellow for warning or exceeding of action levels, e.g., exceeding or going below respective threshold values). The evaluation circuit can access a system of rules for the evaluation, which can be stored on a data base or a memory in the form of rules and which defines a policy for prioritization of a set of result data. The evaluation circuit can preferably be activated automatically if new result data is generated or transferred. The result data are preferably sent to the receivers according to a PUSH protocol for the purpose of open and/or closed loop control. The recipients can be the RO-device or the dialysis machine.

The evaluation is preferably assigned to a certain RO-device. If a central server is used which collects data from all or selected RO-devices (e.g., from all devices within a certain geographical region or a dialysis network) and evaluates them, a result across RO-devices can be provided by means of a statistical evaluation. It is also possible to develop an evaluation that can resolve the messages for the devices according to each RO-device identity (e.g., by means of a respective identification indicator).

An important aspect of the present solution is that the medical equipment of the safety system, which comprises the RO-device, the laboratory system with the analysis unit and may also comprise the water supply unit and/or the dialysis machines, are each connected via two different connections:
1. a data connection for the exchange of electronic messages and digital data, such as sensor data and/or result data, and
2. a physical connection for the exchange of physical media, such as ultrapure water and/or a water sample.

An increased level of safety can be provided by an additional inspection measure. This consists in the fact that the sensor data, which are collected locally on the RO-device, are first evaluated (locally, in a computing unit of the RO-device, or externally in a computing unit on the server or on the analysis unit) in order to provide a preliminary result. This is then made available to the analysis unit if necessary and is either confirmed (validated) or rejected (falsified) by the analysis of the water sample. This allows a preliminary result to be provided even earlier on the RO-device. In addition, safety can be increased by checking the preliminary result again.

In the following, a dialysis device is described as an example for a medical-technical device, e.g., a haemodialysis device. It is obvious for a person skilled in the art that the invention can be used and transferred to other medical-technical, computer-integrated devices or (fluid management) machines or blood treatment devices which require ultrapure water for operating. This can also apply to e.g., peritoneal dialysis devices if they use ultrapure water.

It is possible that the transferring of sensor data from the RO-device and/or of consumption data of the water supply device or another device (e.g., regarding gas consumption, electric power consumption, consumption of temperature resources for heating or cooling etc.) is carried out in a configurable time interval in order to be processed by the evaluation application.

In a preferred embodiment, it is configurable which devices the result data are to be sent to. It can thus e.g., be regulated that the data that comprise a highly prioritized warning message (water quality insufficient) are sent to a control unit of the hospital/the operator and to other entities and in a valid case (sufficient quality) are sent only to the server and/or the respective RO-device. That has the advantage that devices that run clean are not laded with unnecessary messages. It can however also be desirable and configured that all event types are always available on all devices. That way, the operator (of the clinical institution and/or the RO-device) can automatically observe all devices and conditions of the device at a glance.

A computer program product is loaded or loadable into the memory of a computer or of an electronic or medical-technical device with a computer program for executing the method described above if the computer program is executed on the computer or on the electronic or medical-technical device.

A computer program executes all method steps of the abovementioned method if the computer program is run on a computer, an electronic or medical-technical device. It is hereby possible that the computer program is saved on a medium that is readable by the computer or the electronic or medical-technical device.

Currently, it can take several days or up to a week until the lab result is available on the local device. If the result indicates a contamination with bacterial germs or another safety fault, the connected dialysis devices can be turned off by the RO-device only after the information has been forwarded locally to the RO-device. During that time phase, a safety risk exists because the devices continue to be operated with bad water quality. The method using the system may reduce water quality testing time which can reduce the amount of time the dialysis device operates with contaminated water.

The system may improve the safety of RO-devices and medical-technical devices connected to it. Additionally, the analytical ability of the collected captured data (sensor data, laboratory value etc.) may also be improved. Additionally, the system may provide the data relevant for the safety earlier. Furthermore, the provided information is improved with the help of technical messages and is used locally on the device.

In the following detailed description of the figures there are described execution examples which are not to be seen as restrictive with their features and further advantages with the help of the figures.

DETAILED DESCRIPTION OF THE FIGURES

An electronic messaging service for RO-devices is operated and used for dialysis stations with at least one dialysis device or another medical technical device D and communicates a quality condition of the RO-device.

Figure 1:
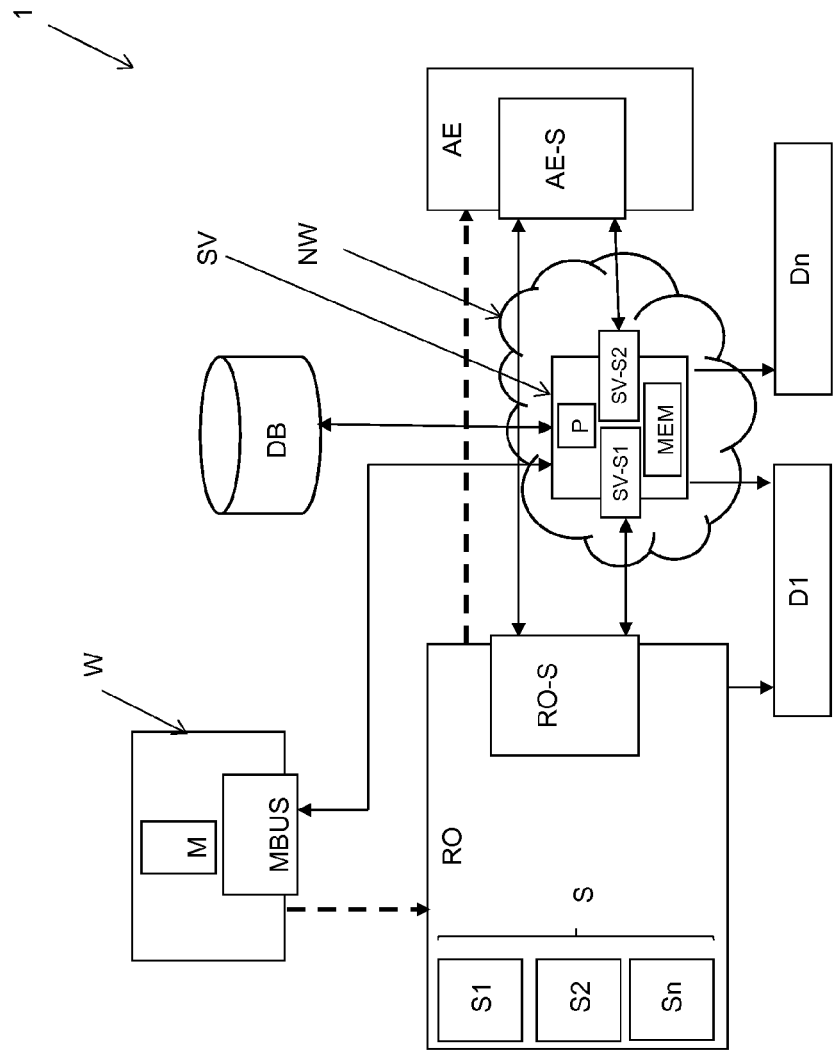
FIG. 1 shows in a schematic representation a safety system with an RO-device for the operation of dialysis devices and a server and their data exchange according to an advantageous embodiment.

FIG. 1 shows a first embodiment whereby the system 1 comprises a server SV. The server SV can at least partially be designed to evaluate water quality data. The evaluation of water quality is based on different input parameters which are provided by different devices (RO-device, analysis unit AE, database DB, etc.).

For this purpose, a safety system 1 is provided which comprises several medical-technical mechanisms, among them medical-technical devices with electronic components each for data processing and communication.

The RO-device is designed for the production of ultrapure water which has to be fed to one or—generally—more dialysis device(s) D of a dialysis station in order for them to be operated. In order to secure a sufficient quality of the input ultrapure water (adherence to threshold values of contaminations, e.g., of aluminium, chlorine, fluoride, sulphates and/or zinc—the threshold values for a respective maximum concentration are defined as shown above in the norm ISO 13959:2014), the RO-device is designed with a sensor unit S to collect sensor data (exemplary in FIG. 1 with sensors S1, S2, Sn). Furthermore, the RO-device comprises an electronic data interface RO-S to send the sensor data collected by the sensor unit S.

The RO-device is supplied by a water supply unit W which serves to supply water that can then be cleaned or treated in the RO-device. The water supply unit W comprises several electronic modules, among others the measuring unit M which serves to determine water consumption data 32. For this purpose, different measuring methods and sensors or signal transmitters can be used. Furthermore, the water supply unit W comprises interfaces for data communication which can be especially designed as an MBUS interface MBUS. Other medical-technical devices of system 1, e.g., the server SV and/or the analysis unit AE can communicate via this interface MBUS with the water supply unit W. This makes it possible for the AE analysis unit to acquire sensor data directly from the water supply unit W. This has the advantageous effect that the analysis unit AE can carry out a more comprehensive evaluation, which in particular takes into account the water consumption data 32 and, if necessary, further sensor data recorded on the water supply unit W for the calculation of the result data.

In a further advantageous embodiment, the sensor data recorded or collected on the water supply unit W can be transferred to the RO-device. This has the advantage that the sensor data of the water supply unit W can be calculated with the locally recorded sensor data of the RO-device to a preliminary result which is sent to the analysis unit for validation. The preliminary result can be displayed on an output unit (e.g., screen) of the water supply unit W and/or the RO-device for local control. This allows more comprehensive and meaningful calculations to be made for the preliminary result.

The analysis unit AE can be arranged in a laboratory system. The laboratory system with laboratory apparatuses is configured to analyse a water sample of the RO-device in regards to safety requirements and especially in regards to contamination. On the basis of the analysis result and, if necessary, taking into account additionally recorded sensor data (from the water supply unit W and/or from the RO-device), result data are calculated or generated in accordance with stored rules. The result data are also provided in a digital format, especially in a result format. Hereby it can be a matter of a configurable data structure, especially according to the XML-format. Furthermore, the analysis unit AE comprises an analysis interface AE-S in order to send the generated result data in electronic form to external communication partners (especially to the RO-device RO and/or to the connected dialysis devices D).

The units and devices of the safety system 1 are connected via a network NW.

As indicated in FIG. 1, there are typically several dialysis devices D and/or further units connected to the RO-device. This is represented in FIG. 1 by the two exemplarily shown devices DI. Dn.

The safety system 1 comprises a server SV in a in FIG. 1 represented (first) preferred embodiment. It is preferably centrally accessible via network interfaces via a technical communication network NW and can be designed as a cloud server. The server SV is in a data exchange with the connected devices, especially with the RO-device, the medical-technical devices D, the analysis unit AE and if necessary the database DB. In this first embodiment, an evaluation application or an evaluation functionality is implemented in a processor P on the server SV which is designed to evaluate the detected data. Especially the result data and the sensor data and if applicable historic data are processed from a database DB according to pre-definable rules in order to indicate a result message about the quality condition of the water provided by the RO-device. The result message can preferably be used to operate the RO-device and/or the connected dialysis devices D. Hereby, the relevant results can be provided directly locally at the point of use. The server SV and the evaluation application implemented in it can preferably be provided as a web-platform and browser-based. The server can access a local memory MEM for further calculations, e.g., statistic evaluation, and/or can save the determined or imported data there.

In the database, configurable rules can also be stored in a preferred embodiment, which specify when the result data is to be sent to the respective recipients. Furthermore, it can be defined—for example, specifically for certain geographical regions or countries—which additional functions and messages are to be sent to the recipients together with the results data in a data package. The functions can be, for example, control functions for the dialysis machine and/or the RO-device (switching the dialysis machine on and off, limiting the machine's functionality—especially depending on the analysis result, etc.) and the messages can be the creation of warning messages (e.g., on the RO-device that the water quality does not meet the required safety requirements with information on limit violations). The rules can be specified in a configuration phase dedicated to the respective recipients of the result data (or data packages) or different recipient groups. This is advantageous for achieving important additional flexibility.

The server SV and the evaluation application implemented on it can preferably be provided as web platform and browser-based. The server SV can access a local memory MEM for further calculations, e.g., statistical evaluations, and/or store the calculated or read-in data there.

As already described briefly above, the analysis unit AE is designed to generate result data from the lab report or the laboratory results according to a predefined format in order to transfer them to an external communication partner.

In FIG. 1, the dotted arrows (from the water supply unit W to the RO-device and from the RO-device to the analysis unit AE) are meant to indicate that it is not a matter of a data transfer but a transfer of physical mediums, thus in the first case it is water being transferred to the RO-device and in the second case it is a water sample being transferred to the analysis unit AE. The other arrows indicate the electronic exchange of analogue and/or digital data.

Generally, the system can be operated in two embodiments.

As described above, a central server SV is connected to the system 1 in a first embodiment shown in FIG. 1. On the server SV, the evaluation application for evaluating the detected data is implemented. The server SV is preferably cloud-based and is accessible via IP-based interfaces (e.g., TCP/IP) SV-S1, SV-S2. In this embodiment, the exchanged data are first sent from the respective sender (e.g., RO-device, analysis unit AE) to the central server SV which then sends the received data either directly or in pre-processed form to the respective recipient (e.g., RO-device, analysis unit AE). Furthermore, the data from the water supply unit W and/or the data of the dialysis devices D can communicate via the interfaces SV-S1, SV-S2 (not explicitly shown in FIG. 1). Thus, the server SV operates in this embodiment as a proxy or intermediary node in the chain between data source and data sink. This embodiment has the advantage that all data can be aggregated on the server SV in order to allow for another evaluation and processing to be carried out. That way, especially historic datasets can be compared with current datasets in order to be able to provide further statements (e.g., "In 80% of the cases in which the result data indicate an insufficient water quality, the sample has been taken from a group of RO-devices that are located in a certain geographic region" or "in 90% of the cases in which the result data indicate an insufficient water quality, the sample has been taken in a certain time phase"). In particular, a statistic evaluation across RO-devices can be carried out. Furthermore, the hereby determined reference data can be provided on other RO-devices for the purpose of comparison/reference. Furthermore, manually entered data relating to the RO-device can be considered as well within the scope of the evaluation application. For accessing and saving the data, the memory MEM can be used.

In a second embodiment there is no central server provided. In this case, the RO-device and/or the water supply unit W and/or the dialysis device D interact directly with the analysis unit AE and vice versa. This second embodiment is meant to be represented in FIG. 1 by the fact that at least the RO-device communicates directly (without intermediation by the server SV) with the analysis unit AE which is marked by the arrow between the respective interfaces RO-S, AE-S, which runs without intermediation by the server SV. In this case, the evaluation application for evaluating the data and for determining the result message can be provided at least partially on the analysis unit AE. The application can also be partially implemented on other electronic devices. The result data or the result message then comprise a control dataset which is designed for operating the respective device. In case of an error (insufficient ultrapure water quality), the control dataset can comprise a section that e.g., triggers the issuing of a warning message and/or a deactivation of the RO-device. Furthermore, the control data set can comprise a notification field which triggers a notification of further entities or devices. This notification is meant to be put into effect especially when the control dataset has been transferred to the external communication partner (e.g., to the RO-device). That way, there can be triggered automatically e.g., warning messages directly and locally on the dialysis devices D which are connected to the RO-device. That has the advantage that in cases relevant to security, the relevant information can be provided directly and locally and thus necessary measures can be initiated directly without having to inform interconnected entities. In an advantageous version it is intended that the result data or the result message has to be cleared by a user (e.g., a laboratory consultant)

before they are transferred to further devices and entities. This can be carried out via a provided field and a user input determined on said field. The clearing can be tied to different roles of the user (with specific qualifications).

This embodiment is described in greater detail by means of FIG. 4 further below.

Figure 2:
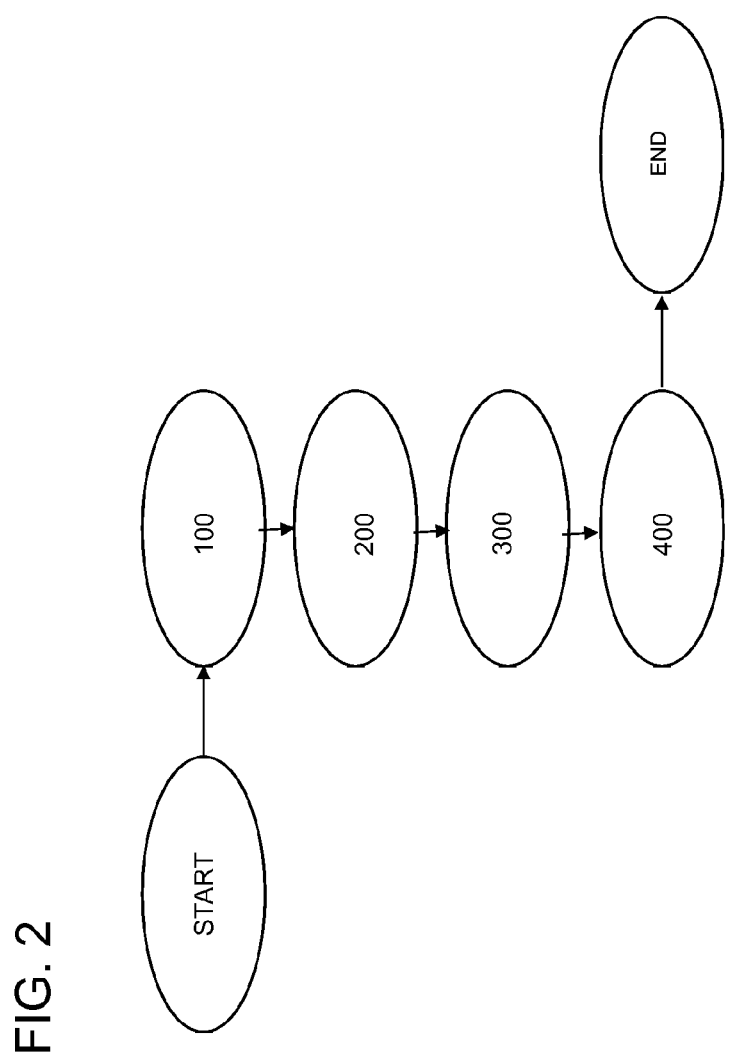
FIG. 2 is a flow chart of a method according to a preferred embodiment.

FIG. 2 shows the procedure of the method according to a preferred embodiment. After the start of the method for the safety-related quality check of the RO-device and thus the operation of connected dialysis devices D according to the law, sensor data are collected in step 100 during the operation of the RO-device. This takes place preferably in pre-definable time intervals, after pre-configurable events (e.g., upon connecting another dialysis device D and/or after carrying out a certain number of dialyses) and/or continuously during the operation of the RO-device. In step 200, the sensor data collected on the RO-device and/or on the water supply unit W are sent to an external communication partner (outside of the RO-device) in electronic form. According to one of each of the both above described embodiments, the sensor data are transferred to the server SV or to the analysis unit AE. The analysis unit AE additionally receives the water sample and analyses it in order to be able to provide result data. This takes place in step 300. In the following step 400, the generated result data are transferred in electronic form for the operation of the RO-device and/or the medical technical device D either directly to the respective devices RO, D, and/or to the server SV. They are then processed transferred from the server SV and can be saved centrally there as well. That way, a first RO-device can also access reference data from other second RO-devices in comparable form. Thereafter, the method can be carried out iteratively or can be ended.

Figure 3:
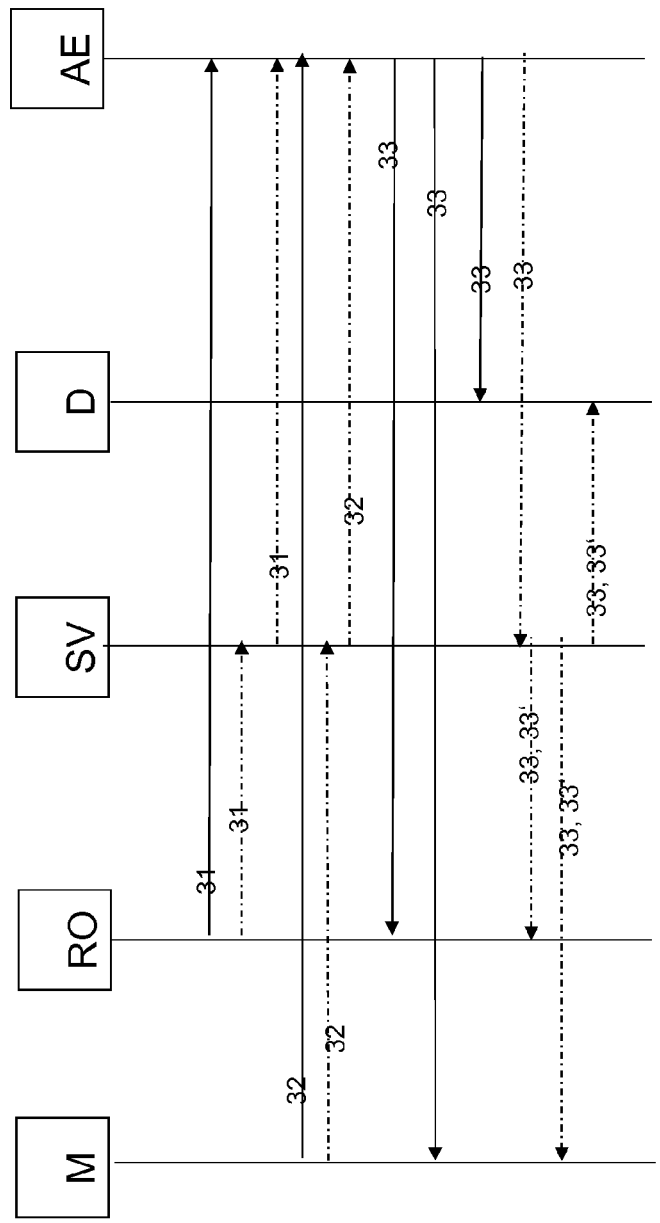
FIG. 3 shows schematically the data exchange between dialysis device and server and RO-device according to an embodiment and FIG. 4 shows an embodiment of the safety system without a server alternative to FIG. 1.

FIG. 3 shows a sequence diagram with both of the different versions for data exchange between the electronic units of the system 1 as described above:
1. With a central server SV and an evaluation application implemented on it (dot-and-dashed line);
2. Without a server (continuous lines). Here, the RO-device and the dialysis device D and the measuring unit M interact directly with the evaluation application that is in this case implemented on the evaluation unit AE.

During the operation of the RO-device, sensor data 31 are collected locally and are sent from there directly to the analysis unit AE (continuous arrow). Alternatively, the sensor data are sent first to the server SV and are then sent from there to the analysis unit AE (depicted in FIG. 3 as dot-and-dash). Parallel or simultaneously, water consumption data 32 are collected on the measuring unit M of the water supply unit W which are sent to the server SV for the purpose of evaluation in the first version (depicted in FIG. 3 as dot-and-dash). Alternatively or cumulatively, the water consumption data 32 can also be sent to the analysis unit AE (continuous line). In this case, an evaluation application for the evaluation of the data is implemented on the analysis unit AE, so that the respective functionality of the server SV is transferred in this case to the analysis unit AE (represented schematically in FIG. 4). The analysis unit AE generates a result dataset 33 on the basis of the executed laboratory examination or the analysis which is then transferred directly to the medical-technical devices RO, D, W (continuous lines)—or in the other embodiment via intermediation and/or saving of the server SV which then sends the data in processed or unprocessed form to the recipients RO, D, W (represented in FIG. 3 dot-and-dash). The processing and evaluation on the server SV can comprise further method steps as described above, e.g., a statistic evaluation or a comparison with historic data. The further result of these method steps is indicated in FIG. 3 with the reference sign 33' and can be sent to the respective local entities RO, W, D.

Figure 4:
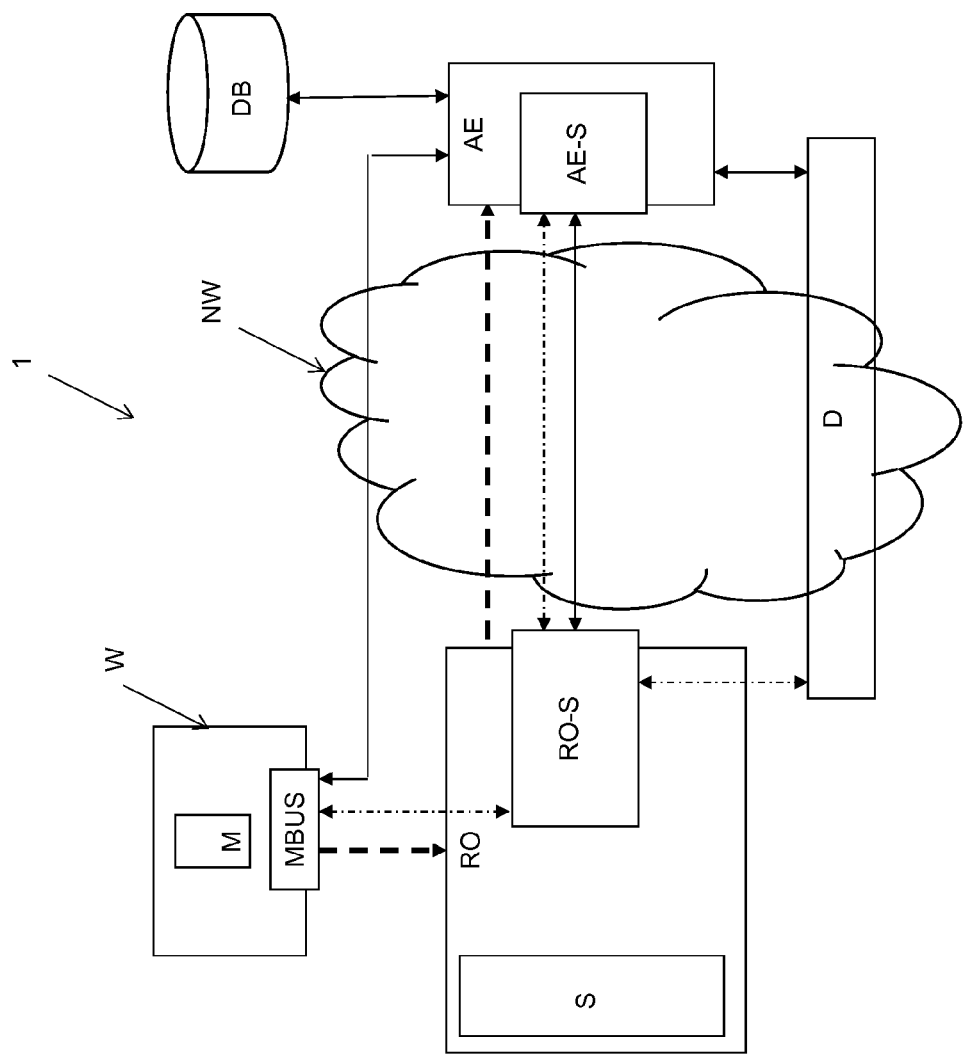

FIG. 4 schematically shows an embodiment whereby the system is operated without a server. The dashed lines (W→RO, RO→AE) do not represent—like in FIG. 1—a data exchange, but the transfer of physical products (water, ultrapure water). Regarding the data exchange, the RO-device RO and the analysis unit AE and if applicable the water supply unit W interact with each other directly via a network which can e.g., be TCP/IP-based. In this embodiment, the functionality that has been implemented on the server SV in the first embodiment is implemented on the analysis unit AE. The data of the water supply unit W or its measuring unit M, the sensor data of the RO-device and if applicable the data of the dialysis devices D are sent directly to the analysis unit AE and are processed there. It is also possible that the water supply unit W is connected with the RO-device via a data interface. The data collected on the water supply unit W can then be sent indirectly via the intermediation of the RO-device to the analysis unit AE. For processing the imported data on the analysis unit AE, reference data can be imported from the database DB and vice versa, the data collected by the analysis unit AE and the processed data can be saved on the database DB. The result of the analysis is either transferred to the RO-device (dot-and-dash line) or the data can be sent from the analysis unit AE directly to the water supply unit W for the purpose of operating (this embodiment is indicated in FIG. 4 with the continuous arrow).

Accordingly, it may be pointed out that the description and the embodiments are generally not to be seen as restrictive in regards to certain physical realizations. All features described and shown in connection with individual embodiments can be intended in different combination in order to realize their advantageous effect. It is thus also within the scope to provide alternatively or cumulatively to the server SV other central units, e.g., a database DB. Equally, there can be further medical-technical devices and/or computer-based devices (such as mobile devices) connected to the RO-device apart from the dialysis devices D, on which the result data are issued. It is in particular obvious for a person skilled in the art that system may be used in dialysis devices, or other medical-technical devices D which require ultrapure water from an RO-device for operation. Thus, e.g., the monitoring of the quality of the ultrapure water can also be used for sterilisation and cleaning processes for the sterilisation of the clinical set of instruments.

Furthermore, the components or modules of the safety system for the monitoring of the quality of the ultrapure water can be realised distributed across several physical products. It is thus e.g., within the scope that an application for the evaluation of the result data is completely or partially arranged on the analysis unit AE or that the application is implemented completely or partially on the server SV. Additionally, sections of the computer program for executing the method can also be implemented directly on the medical-technical devices D, RO.

REFERENCE SIGNS

D Medical-technical device, especially dialysis device
SV Server
P Evaluation unit
MEM Memory
RO Reverse osmosis device, shortened: RO-device
AE Analysis unit AE-S Analysis interface of the analysis unit
RO-S Data interface of the RO-device
W Water supply unit
M Measuring unit of the water supply unit
MBUS Bus interface of the water supply unit
100 Collecting sensor data
200 Sending sensor data collected on the RO-device
300 Generating result data
400 Sending result data
DB Database
NW Network

The invention claimed is:

1. An electronic safety system for a reverse osmosis device (RO-device), the electronic safety system comprising:
   the RO-device, wherein:
      the RO-device comprises a sensor unit for collecting sensor data, the sensor data comprising measurements of feed water conductivity, permeate conductivity, retention, and water temperature,
      the RO-device is configured to produce ultrapure water for a dialysis machine and;
      the RO-device comprises an electronic data interface configured to send the sensor data collected by the sensor unit;
   a water supply unit having a measuring unit to determine water consumption data,
      the water supply unit having an electronic data interface configured to forward the determined water consumption data;
   a laboratory system comprising:
      a laboratory apparatus; and
      an analysis unit having an analysis interface, wherein:
         the laboratory apparatus is configured to analyze a contamination level of a water sample from the RO-device, and
      the analysis unit is configured to generate and transmit result data based on the analysis of the laboratory apparatus;
   an evaluation unit having access to a rule base comprising rules that define actions to be taken based on the collected sensor data, on the water consumption data, and on the result data; and
   a network in electronic communication with the RO-device, the water supply unit, the evaluation unit, and the analysis unit of the laboratory system, wherein:
      the network is configured to exchange the sensor data between the RO-device and the evaluation unit, the network is configured to exchange the water consumption data between the water supply unit and the evaluation unit, and the network is configured to exchange the result data between the analysis unit and the evaluation unit, and
      the electronic safety system is configured to automatically control a flow of ultrapure water from the RO-device to the dialysis machine based on results of the evaluation unit according to a PUSH protocol.

2. The safety system according to claim 1, further comprising:
   a server configured to receive the sensor data of the RO-device.

3. The safety system according to claim 1, further comprising:
   a server configured to receive the result data of the analysis unit.

4. The safety system according to claim 3, wherein the server is configured to send the result data to the RO-device and to a medical-technical device for the purpose of open loop control and closed loop control.

5. The safety system according to claim 3, wherein the server is configured to send the result data to the RO-device or to a medical-technical device for the purpose of open loop control or closed loop control.

6. The safety system according to claim 3, wherein the server is configured to send the result data to the RO-device or a medical-technical device for the purpose of open loop control and closed loop control.

7. The safety system according to claim 3, wherein the server is configured to send the result data to the RO-device and a medical-technical device for the purpose of open loop control or closed loop control.

8. The safety system according to claim 1, wherein the measuring unit comprises:
   a Bus interface to send the collected water consumption data.

9. The safety system according to claim 1, wherein the sensor data comprise parameters regarding the conductivity and parameters regarding the retention.

10. The safety system according to claim 1, wherein the sensor data comprise parameters regarding the conductivity or parameters regarding the retention.

11. The safety system according to claim 1, wherein a preliminary result is calculated locally from the sensor data and sent to the analysis unit to be validated or falsified in the analysis unit based on the water sample.

12. A reverse osmosis device (RO-device) configured to produce ultra-pure water for a dialysis machine, the RO-device comprising:
   a sensor unit configured to collect sensor data based on the produced water, the sensor data comprising measurements of feed water conductivity, permeate conductivity, retention, and water temperature; and
   an electronic data interface communicably coupled to an evaluation unit remote from the RO-device via a network and configured to transmit the sensor data collected by the sensor unit to the evaluation unit via the network;
   a control unit communicably coupled to the evaluation unit via the network and configured to receive result data from the evaluation unit via the network, wherein the control unit is configured to automatically control a flow of ultrapure water from the RO-device to the dialysis machine based on a preliminary result by the evaluation unit, wherein the evaluation unit is configured to provide the preliminary result according to a PUSH protocol, the evaluation unit having access to a rule base comprising rules that define actions to be taken based on the collected sensor data, on water consumption data, and on validated result data generated and transmitted based on an analysis, by an analysis unit of a laboratory system, of a contamination level of periodically sampled water samples produced from the RO-device.

13. The RO-device according to claim 12, wherein the preliminary result is calculated locally from the sensor data and sent to the analysis unit to be validated or falsified in the analysis unit based on the water sample.

* * * * *